Aug. 17, 1954 M. S. GOTTLIEB 2,686,835

TELEPHONE AND SIMILAR COMMUNICATION SYSTEMS

Filed Jan. 20, 1954

INVENTOR.
MORTON S. GOTTLIEB
BY
Alfred W. Petchaft
ATTORNEY

Patented Aug. 17, 1954

2,686,835

UNITED STATES PATENT OFFICE 2,686,835

TELEPHONE AND SIMILAR COMMUNICATION SYSTEMS

Morton S. Gottlieb, University City, Mo., assignor to Jay V. Zimmerman Company, St. Louis, Mo., a corporation of Missouri Application January 20, 1954, Serial No. 405,072

5 Claims. (Cl. 179—1)

This invention relates in general to certain new and useful improvements in telephone and similar communication systems and, more particularly, to an intercommunicating telephone set.

As pointed out in my co-pending application, Serial No. 368,896, telephonic systems for children should comprise a pair of wire-connected instruments by which two persons can communicate over a substantial distance, and can also signal each other when ready to conduct a conversation, and it is desirable that such instruments be light in weight, inexpensive to manufacture, and simple to operate. It, therefore, becomes extremely desirable to employ a minimum number of components capable of operation by small flashlight batteries or similar power sources. Furthermore, such devices must be constructed ruggedly and yet inexpensively so that the purchase price will remain within reasonable range.

It is, of course, conventional in the telephone art to provide telephone handsets having bells, buzzers, and other audible signaling means and to connect such audible signaling means by independently wired circuits for purposes of ringing the user when another person is endeavoring to call on the telephone. It has thus far not been considered possible, however, to employ a simple two-wire system, which incorporates an audible signaling means utilizing standard components of the telephone handset and capable of being operated with a low voltage direct current power source, such as a single flashlight cell.

It is the primary object of the present invention, therefore, to provide a pair of telephone handsets having audible signaling means and being connected in sets by a simple two-wire conductor.

It is another object of the present invention to provide a pair of wire-connected toy telephones which are simple and economical in construction and can be readily assembled with a minimum of labor cost and loss due to rejections for faulty construction.

It is another object of the present invention to provide a toy telephone set which is rugged and durable and simulates in appearance the conventional type of telephone handset which is currently in commercial use.

With the above and other objects in view, my invention resides in the novel features of form, construction, arrangement, and combination of parts presently described and pointed out in the claims.

In the accompanying drawings (one sheet)—

Figures 1, 2, 3, 4, 5, 6:
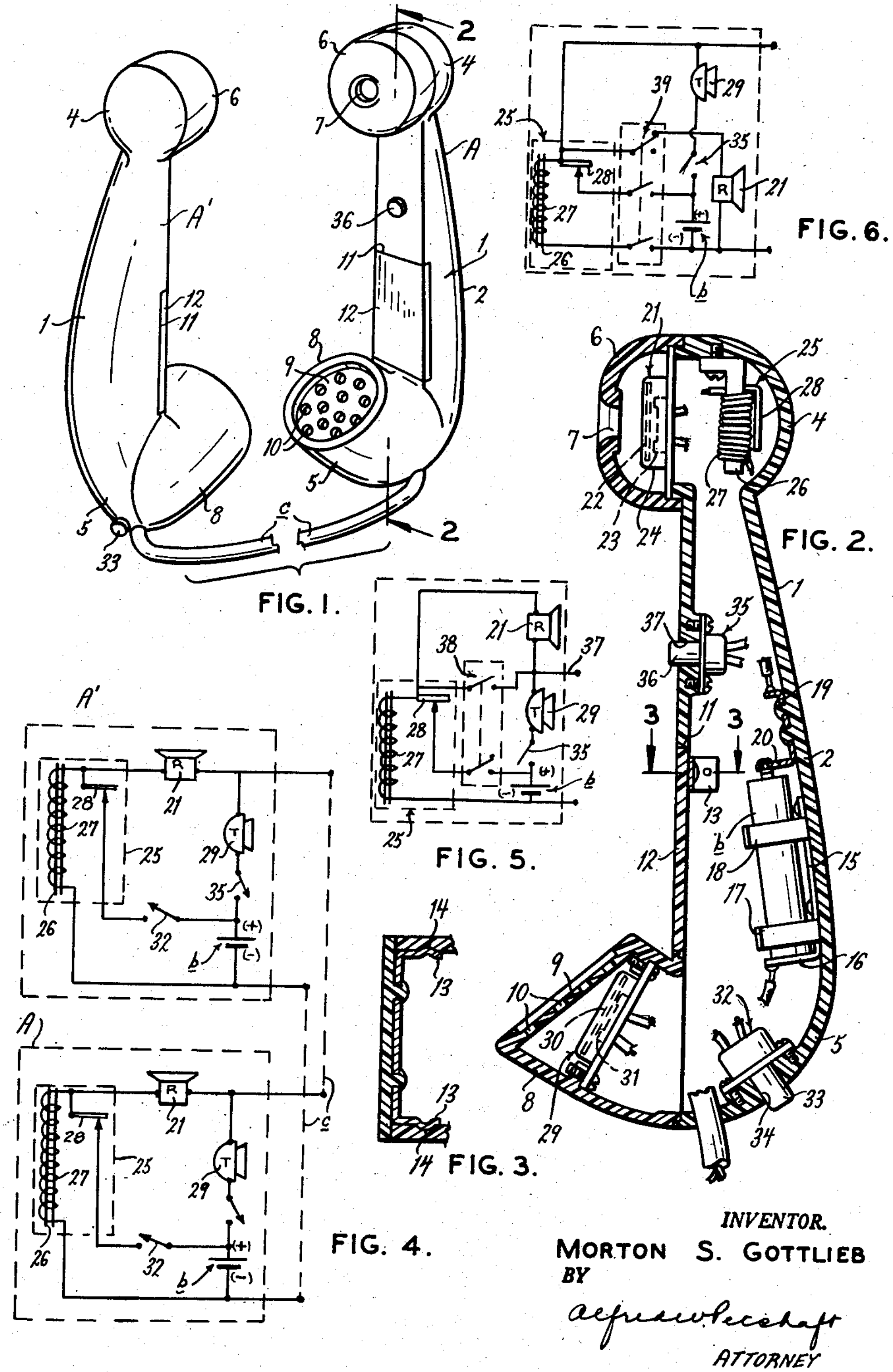
Figure 1 is a perspective view of a pair of toy telephone handsets constructed in accordance with and embodying the present invention.
Figure 2 is a longitudinal sectional view of the telephone handset taken along line 2—2 of Figure 1.
Figure 3 is a fragmentary transverse sectional view taken along line 3—3 of Figure 2.
Figure 4 is a schematic wiring diagram showing the electrical connections constituting one form of circuit embodying the present invention.
Figure 5 is a schematic wiring diagram of a modified form of circuit embodying the present invention.
Figure 6 is a schematic wiring diagram of a further modified form of circuit embodying the present invention.

Referring now in more detail and by reference characters to the drawings which illustrate practical embodiment of the present invention, A, A′ designate two telephone handsets which are identical and are connected by a length of two-wire conductor *c* to form a toy telephone system which can be utilized by two children for intercommunication with each other. The conductor can have a length up to 150 or possibly 200 feet, without materially reducing the effectiveness or audibility of the signals therebetween.

The telephone handset A comprises a hollow elongated handle 1 molded preferably from Bakelite or any other synthetic plastomer and integrally includes an arcuate back wall 2, a flat front wall 3, and enlarged somewhat spherical earpiece and mouthpiece portions 4, 5, respectively. The earpiece portion 4 is provided with a cap 6 having a centrally provided opening 7, through which sound may readily travel, and similarly, the mouthpiece portion 5 is provided with a cap 8, having an angularly inclined or oblique front wall 9, a substantial portion of which is provided with perforations 10, also arranged to permit the free travel of sound therethrough. The front wall 3 of the handle 1 is provided with a rectilinear opening 11 adapted for snugly receiving a flat cover plate 12, the latter being provided upon its interior face with a pair of inwardly presented resilient prongs 13 contoured for engagement with inwardly presented marginal bosses 14, formed on the interior of the handle 1. The cover plate 12 is thus manually removable at will to permit access to the interior of the handle, as best seen in Figure 3, for purposes more fully appearing.

Riveted or otherwise suitably attached upon the interior face of the back wall 2 is a metallic battery-retaining plate 15, having an upstanding contact flange 16 and longitudinally spaced pairs of battery-engaging clips 17, 18. Also riveted or otherwise rigidly secured upon the inner face of the back wall 2 in outwardly spaced relation to the clip 15 is a contact member 19, having upstanding terminal flange 20. Removably inserted into the clips 17, 18 is a small dry-cell battery *b* with its one terminal in contact with the flange 16 and its other terminal in contact with the member 19. The battery *b* can, of course, be reached for replacement by removal of the cover plate 12.

Suitably mounted within the earpiece 4 in rearwardly spaced proximate relation to the opening 7 of the cap 6 in a conventional telephone receiver element 21 is an electromagnetic vibrator or interrupter 25, consisting of a laminated pole piece or core 26 provided with a winding 27 and an armature 28.

Similarly mounted in the cap 8 is a substantially conventional telephonic transmitter element or microphone 29, including a sound-responsive diaphragm 30 and compressible carbon-particle capsule 31. Also rigidly mounted in the lower end or mouthpiece portion 5 of the handle 1 is a spring-biased double pole single throw push button switch 32, having a manually actuable push button 33 which projects outwardly through an aperture 34 in the lower portion of the back wall 2. Similarly mounted upon the innerface of the front wall 3 of the handle 1 is a spring-biased single pole single throw push button switch 35, having an outwardly projecting push button 36 extending through an aperture 37.

The receiver element 21, the transmitter element 29, the battery *b*, the interrupter 25, and the push button switches 32, 35 are connected in the manner shown in Figure 4. The manufacture and assembly of the handsets A, A′ is thereby materially simplified inasmuch as a smaller number of wires and connections are needed internally as compared with conventional telephones or with the telephone disclosed in the aforementioned co-pending application. As will be seen, the switches 32 and 35 are normally spring-biased to "off" or open position. When the user of telephone handset A′ desires to call or attract the attention of the user of telephone handset A, he presses the push button 33 of the switch 32, thereby closing the contact between the battery *b* and the interrupter 25 of the telephone handset A′. As soon as the interrupter 25 is thus energized, it begins a rapid series of makes and breaks, thereby generating a high frequency impulse or so-called transient voltage which is transmitted through the conductors *c* to the receiver element 21 of the telephone handset A, causing the latter to vibrate responsively and create a very rapid clicking sound which has a close audible similarity to the noise produced by a conventional buzzer. As soon as the user of the telephone handset A hears the buzz-like sound in his handset A he knows that his playfellow is trying to call him on his telephone, and thereupon manually presses the pushbutton 36 down closing the circuit to his own transmitter element 29, so that he can speak into it and acknowledge his readiness to receive a message by saying the usual, "Hello" or any other conventional signal or greeting. Of course, the first caller will press the push button 33 of his instrument several times in quick succession or hold it depressed for a few seconds and then release it to listen for a response and then will hear the "Hello" or other greeting from the user of handset A and can listen to the message coming into his receiver element 21. He can reply thereto by pressing the push button 36 of his own telephone handset A′ and return the message or make any other verbal statement which he chooses to make. As long as the two users of the telephone handsets A, A′ keep the push button 36 thereof respectively depressed, a two-way conversation can be conducted in exactly the same manner as can be carried on by two adults using a commercial type of telephone. It should be noted in this connection that the polarities of the two batteries are so arranged that they oppose each other, and therefore, the battery of the telephone handset A′, in effect, becomes the power source for the circuit between the transmitter 29 thereof and the receiver element 21 of the telephone handset A. Similarly, the battery *b* of the telephone handset A becomes the power source for the transmitter element 29, thereof, and the receiver element 21 of the telephone handset A′.

If desired, the telephone handsets A, A′ may be connected in a modified manner as shown in Figure 5. In this form of the invention, the receiver element 21 and microphone 29 of each of the handsets A, A′ are connected to a common lead 37, and across a two-bladed single throw switch 38 so that when the buzzing signal is emitted in one handset the receiver of that handset will be disconnected. Consequently, the buzzing signal will be inaudible in the receiver element 21 of the signalling handset. A similar result, employing a three-bladed switch 39 can be achieved by connecting the components as shown in Figure 6. This latter circuit has the advantage that the power source or battery is completely disconnected from all components of the circuit when not in use.

It should be understood that changes and modifications in the form, construction, arrangement, and combination of the several parts of the toy telephone system may be made and substituted for those herein shown and described without departing from the nature and principle of my invention.

Having thus described my invention, what I claim and desire to secure by Letters Patent is:

1. An intercommunication system including two telephonic units each comprising a voice transmitter having two terminals, a voice receiver having two terminals, a power source having two terminals, means for generating a transient voltage in each telephonic unit at the will of the user thereof, a two-wire conductor connecting the two telephonic units, one terminal of said receiver being connected directly to said means and the other terminal of the receiver being connected to one wire of the conductor, said transmitter having one terminal connected directly to one wire of the conductor and its other terminal connected through a normally open manually operable switch to one terminal of the power source, a normally open switch adapted for manual closure whereby to connect the transient current generating means to one of the power sources in the system in order to energize said means and cause it to impose a transient current generated thereby upon the conductor for transmittal to the receiver of the other telephonic unit whereby to cause the latter to emit an audible calling signal, and a second normally open switch adapted upon being closed to impose a voice signal from the voice transmitter of one telephonic unit upon the conductor for transmittal to the voice receiver of the other telephonic unit.

2. An intercommunication system including two telephonic units each comprising a voice transmitter having two terminals, a voice receiver having two terminals, a vibrator having two coil-terminals and an armature-terminal and a power source having first and second leads of opposite polarity respectively, one coil-terminal and one terminal of the receiver being connected in common to each other, a first normally open switch connected in series with the armature terminal and the power source so that when said switch is closed the armature terminal is connected to the first lead from the power source, the second lead from the power source being connected directly to the other coil terminal, a second normally open switch connected in series with one terminal of the transmitter and the first lead from the power source, the other terminal of the transmitter being connected to the other terminal of the receiver, and a two-wire conductor, one wire of which is connected at its opposite ends to the second power-source lead of each telephonic unit respectively, the other wire being connected at its opposite ends to the common connections between the receiver and transmitter of each telephonic unit respectively so that by closure of the first switch in one telephonic unit the vibrator thereof will be energized and generate a transient current which is transmitted to the receiver of the other telephonic unit and cause the latter to emit an audible calling signal, and similarly by closure of the second switches in both units while permitting the first switches to remain open, voice signals will be transmitted over the conductor between the two units.

3. An intercommunication circuit including two identical telephonic units adapted to be connected by a two-wire conductor, each unit comprising a transmitter having two terminals, a receiver having two terminals, one transmitter terminal and receiver terminal being connected in common to one wire of the two-wire conductor, a battery having two terminals, a normally open talk-switch adapted, upon closure, to connect the other terminal of the transmitter to one terminal of the battery, a vibrator adapted, upon energization, to emit transients, said vibrator including an armature having one terminal and a coil having one terminal, said coil and armature further having one common terminal, the latter being connected to the other terminal of the receiver, one coil terminal and the other battery terminal being connected in common to the other wire of the conductor, a manually actuable call-switch having two contactors mechanically connected for simultaneous movement, one of said contactors being adapted, upon actuation of said call-switch, to connect the common armature-coil terminal directly to the first-mentioned receiver terminal, the contactors being arranged so that upon actuation of the call-switch of one unit, the contactors of such unit will connect the battery thereof across the armature and the terminal of the coil in such unit whereby to energize the vibrator in such unit and impose the transients emitted thereby upon the two-wire conductor for transmission to the receiver of the other unit causing the latter to emit an audible signal.

4. An intercommunication circuit including two identical telephonic units adapted to be connected by a two-wire conductor, each unit comprising a transmitter having two terminals, a receiver having two terminals, one transmitter terminal and one receiver terminal being connected in common to one wire of the two-wire conductor, a battery having first and second terminals, a normally open talk-switch adapted, upon closure, to connect the transmitter to the first terminal of the battery, a vibrator adapted, upon energization, to emit transients, said vibrator including an armature having one terminal and a coil having one free terminal, said armature and said coil further having one common terminal which latter terminal is connected permanently to the other terminal of said receiver, and a normally open manually actuable call-switch in series with the armature terminal and the first battery terminal so that upon actuation of the call-switch of one unit, said call-switch will connect the battery thereof across the armature and the coil in such unit whereby to energize the vibrator in such unit and impose the transients emitted thereby upon the two-wire conductor for transmission to the receiver of the other unit causing the latter to emit an audible signal.

5. An intercommunication circuit including two identical telephonic units adapted to be connected by a two-wire conductor, each unit comprising a transmitter having two terminals, a receiver having two terminals, a battery having two terminals, a normally open talk-switch adapted, upon closure, to connect one terminal of the transmitter to one terminal of the battery, a vibrator adapted, upon energization, to emit transients, said vibrator including an armature having one terminal and a coil having one terminal, said coil and said armature further having one common terminal which latter terminal is connected in common with the other terminal of the transmitter to one conductor wire, and a manually actuable call-switch having three contactors mechanically connected for simultaneous movement, one of said contactors normally connecting one terminal of the receiver to the common armature-coil terminal, the other terminal of the receiver being connected in common with the other battery terminal to the other wire of the two-wire conductor so that the transmitter and receiver of one unit is in circuit with the transmitter and receiver of the other unit when the talk-switches of the two units are closed, the other two contactors being arranged so that upon actuation of the call-switch of one unit, the contactors of such unit will break the connection between the receiver and the common armature-coil terminal and at the same time will connect the battery thereof across the armature and coil in such unit whereby to energize the vibrator in such unit and impose the transients emitted thereby upon the two-wire conductor for transmission to the receiver of the other unit causing the latter to emit an audible signal.

References Cited in the file of this patent

UNITED STATES PATENTS

| Number | Name | Date |
|---|---|---|
| 978,695 | Caughrean | Dec. 13, 1910 |
| 2,492,125 | Bailey et al. | Dec. 20, 1949 |
| 2,653,192 | Shipton | Sept. 22, 1953 |